(12) United States Patent
Kull et al.

(10) Patent No.: US 12,135,067 B2
(45) Date of Patent: Nov. 5, 2024

(54) DAMPING APPARATUS

(71) Applicant: Stabilus GmbH, Koblenz (DE)

(72) Inventors: James T. Kull, Denver, NC (US);
Patrick A. Hartman, Belmont, NC (US); Rodney Armstrong, Gastonia, NC (US); Edward William Twist, Gastonia, NC (US)

(73) Assignee: Stabilus GmbH, Koblenz (DE)

( * ) Notice: Subject to any disclaimer, the term of this patent is extended or adjusted under 35 U.S.C. 154(b) by 715 days.

(21) Appl. No.: 17/260,627

(22) PCT Filed: Jul. 16, 2019

(86) PCT No.: PCT/US2019/041998
§ 371 (c)(1),
(2) Date: Jan. 15, 2021

(87) PCT Pub. No.: WO2020/018532
PCT Pub. Date: Jan. 23, 2020

(65) Prior Publication Data
US 2021/0277973 A1      Sep. 9, 2021

(51) Int. Cl.
*F16F 1/12* (2006.01)
*F16M 11/10* (2006.01)
(Continued)

(52) U.S. Cl.
CPC ............... *F16F 1/128* (2013.01); *F16F 1/12* (2013.01); *F16M 11/10* (2013.01);
(Continued)

(58) Field of Classification Search
CPC ...... F16F 1/12; F16F 1/128; F16F 2230/0005; F16F 2230/0023; F16F 2230/007;
(Continued)

(56) References Cited

U.S. PATENT DOCUMENTS 2,756,071 A      7/1956   Riva
3,758,092 A *    9/1973   McGregor ............. B60N 2/028
                                                      297/354.12
(Continued)

FOREIGN PATENT DOCUMENTS

EP          1826455 A2      8/2007
FR          1419551 A      12/1965
WO     WO2015077628 A1      5/2015

OTHER PUBLICATIONS

European Patent Office. English translation of foreign patent document FR1419551A. Apr. 13, 2021.
(Continued)

*Primary Examiner* — Bradley T King
*Assistant Examiner* — James K Hsiao
(74) *Attorney, Agent, or Firm* — Baker Botts L.L.P.

(57) ABSTRACT

A damping apparatus can be self-centering and include one or more pre-compressed and preloaded mechanical springs. A solar tracking apparatus can include a solar panel mounted on a rotating shaft, and a self-centering damping apparatus operatively connected to the rotating shaft to compensate for torque created when the solar panel is rotated at an angle to horizontal. A steering assembly for a zero-turn riding lawn mower can include a pair of steering levers and a self-centering damping apparatus operatively connected to the steering levers.

12 Claims, 14 Drawing Sheets

(51) Int. Cl.
*F16M 13/02* (2006.01)
*F24S 30/40* (2018.01)
*H02S 20/32* (2014.01)
*F24S 30/00* (2018.01)
*G05G 5/05* (2006.01)

(52) U.S. Cl.
CPC ........... *F16M 13/022* (2013.01); *F24S 30/40* (2018.05); *H02S 20/32* (2014.12); *F16F 2228/08* (2013.01); *F16F 2230/0005* (2013.01); *F16F 2230/0023* (2013.01); *F16F 2230/007* (2013.01); *F16F 2230/04* (2013.01); *F16F 2230/30* (2013.01); *F16F 2232/08* (2013.01); *F16F 2234/02* (2013.01); *F24S 2030/19* (2018.05); *G05G 5/05* (2013.01)

(58) Field of Classification Search
CPC ............... F16F 2230/04; F16F 2230/30; F16F 2232/08; F16F 2234/02; H02S 20/32; F16M 11/10; F16M 13/022; F24S 2030/19
See application file for complete search history.

(56) References Cited

U.S. PATENT DOCUMENTS

| | | | | |
|---|---|---|---|---|
| 4,223,564 A * | 9/1980 | Fawcett | ................... | F16C 1/14 74/502.4 |
| 4,632,228 A | 12/1986 | Oster et al. | | |
| 4,667,780 A | 5/1987 | Pauliukonis | | |
| 4,895,229 A | 1/1990 | Kato | | |
| 4,991,675 A | 2/1991 | Tosconi et al. | | |
| 5,095,581 A | 3/1992 | Sarto | | |
| 5,220,706 A * | 6/1993 | Bivens | ...................... | E05F 3/02 267/225 |
| 5,224,689 A * | 7/1993 | Georgiev | ............... | B60G 11/14 267/225 |
| 5,390,903 A * | 2/1995 | Fidziukiewicz | .......... | F16F 1/32 267/28 |
| 5,450,933 A | 9/1995 | Schuttler | | |
| 5,501,438 A | 3/1996 | Handke et al. | | |
| 5,529,148 A * | 6/1996 | O'Leary | ................. | E05C 17/30 188/300 |
| 5,799,759 A | 9/1998 | Koch | | |
| 5,855,363 A | 1/1999 | Svendsen | | |
| 5,896,959 A * | 4/1999 | Jeffries | ..................... | F16F 9/18 267/250 |
| 5,975,228 A * | 11/1999 | Parfitt | .................... | B62D 33/07 180/69.21 |
| 6,089,966 A | 8/2000 | Latvis, Jr. et al. | | |
| 6,098,966 A * | 8/2000 | Latvis, Jr. | ............... | F16F 13/00 267/221 |
| 6,179,100 B1 | 1/2001 | Mintgen et al. | | |
| 6,220,406 B1 * | 4/2001 | de Molina | .............. | F16F 9/464 267/221 |
| 6,328,291 B1 | 12/2001 | Marzocchi et al. | | |
| 6,460,839 B2 | 10/2002 | Muller | | |
| 6,491,292 B2 | 12/2002 | Stumm et al. | | |
| 6,564,667 B2 * | 5/2003 | Bayer | .................. | B25J 19/0016 901/48 |
| 6,773,002 B2 * | 8/2004 | Adoline | .................... | F16F 3/04 267/168 |
| 6,935,626 B2 | 8/2005 | Champ | | |
| 6,942,204 B2 | 9/2005 | Wolf et al. | | |
| 6,978,985 B2 | 12/2005 | Lung et al. | | |
| 7,066,455 B2 * | 6/2006 | Adoline | .................. | F16F 1/128 267/168 |
| 7,425,188 B2 | 9/2008 | Ercanbrack et al. | | |
| 7,510,175 B2 | 3/2009 | Chiu | | |
| 7,631,922 B2 | 12/2009 | Armstrong et al. | | |
| 7,975,994 B2 | 7/2011 | Born et al. | | |
| 7,993,070 B2 | 8/2011 | Kull et al. | | |
| 8,146,417 B2 | 4/2012 | Glasson et al. | | |
| 8,459,249 B2 | 6/2013 | Corio | | |
| 8,627,933 B2 | 1/2014 | Six et al. | | |
| 8,714,531 B2 | 5/2014 | Roma | | |
| 9,057,546 B2 | 6/2015 | Sade | | |
| 9,206,873 B2 * | 12/2015 | Kull | ....................... | F16F 9/0254 |
| 9,598,889 B2 * | 3/2017 | Löhken | ................. | F16F 13/005 |
| 9,714,093 B2 * | 7/2017 | Cuddy | ....................... | F16F 9/19 |
| 9,829,034 B2 | 11/2017 | Armstrong et al. | | |
| 9,917,546 B2 | 3/2018 | Sade | | |
| 9,985,154 B2 | 5/2018 | Needham et al. | | |
| 9,995,506 B2 | 6/2018 | Doyle | | |
| 10,221,915 B2 * | 3/2019 | Kull | ......................... | E05C 17/30 |
| 10,648,528 B2 | 5/2020 | Kull et al. | | |
| 10,676,110 B2 * | 6/2020 | Huck | ......................... | F16F 3/04 |
| 10,848,097 B1 | 11/2020 | Needham et al. | | |
| 10,903,782 B2 | 1/2021 | Needham et al. | | |
| 11,118,941 B2 | 9/2021 | Ehre | | |
| 11,209,337 B1 | 12/2021 | Needham et al. | | |
| 11,416,010 B2 | 8/2022 | Needham et al. | | |
| 11,422,575 B2 | 8/2022 | Needham et al. | | |
| 2003/0107028 A1 | 6/2003 | Martin | | |
| 2003/0197502 A1 | 10/2003 | Nyce et al. | | |
| 2003/0213663 A1 * | 11/2003 | Salice | ....................... | F16F 9/0209 188/284 |
| 2004/0113341 A1 * | 6/2004 | McConnell | .............. | F16F 1/128 267/195 |
| 2005/0029719 A1 * | 2/2005 | Adoline | .................... | F16F 3/06 267/286 |
| 2007/0068753 A1 | 3/2007 | Schmidt | | |
| 2009/0271998 A1 | 11/2009 | Carlen et al. | | |
| 2011/0278778 A1 * | 11/2011 | Qattan | ...................... | F16F 3/00 267/171 |
| 2013/0206524 A1 | 8/2013 | Bohrer et al. | | |
| 2014/0077429 A1 * | 3/2014 | Battey | ...................... | A47C 7/443 267/177 |
| 2014/0338659 A1 | 11/2014 | Corio | | |
| 2015/0107583 A1 | 4/2015 | Doyle | | |
| 2016/0265619 A1 * | 9/2016 | Kull | ............................ | E05F 3/18 |
| 2018/0037251 A1 | 2/2018 | Nelson | | |
| 2019/0072150 A1 | 3/2019 | Kull et al. | | |
| 2020/0248773 A1 | 8/2020 | Chandrashekar et al. | | |

OTHER PUBLICATIONS

International Search Report for International Application No. PCT/US2019/041998. Nov. 25, 2019.
Written Opinion of the International Searching Authority for International Application No. PCT/US2019/041998. Nov. 25, 2019.

* cited by examiner

DAMPING APPARATUS

CROSS REFERENCE TO RELATED APPLICATIONS

This application is a national stage application of International Application No. PCT/US2019/041998, filed Jul. 16, 2019, which claims priority to U.S. Provisional Patent Application No. 62/698,372, filed Jul. 16, 2018, which is incorporated by reference herein.

TECHNICAL FIELD

The present invention relates to the mechanical arts. An embodiment of the invention comprises a self-centering damping apparatus. Another embodiment of the invention comprises a solar tracking system comprising a self-centering damping apparatus. Another embodiment of the invention comprises a lawn mower comprising a self-centering damping apparatus.

BACKGROUND

U.S. Pat. No. 5,896,959, which is incorporated herein by reference, discloses a bi-directional damper with a self-centering mechanism. The damper comprises a body 14 and a piston rod 28 positioned partially within the body 14 for reciprocal movement within the body 14. A coil compression spring 102 is disposed outside of the body 14. The spring 102 is not contained within the body 14 that houses the piston rod 28, and is susceptible to contamination from debris and other external elements.

Solar energy can be converted to electric energy through the use of solar (photovoltaic) panels. One or more panels can be attached to a rotating structure to form an array configured to follow the sun. Solar tracking devices can rotate an array of panels to maintain alignment with the sun over the course of a day to maximize energy collection. The weight of the solar panels is centered when the panel is horizontal, but when rotated off horizontal a moment is induced into the rotating member on which the panel is mounted. Existing solar tracking systems compensate for this applied moment with larger motors and gearboxes. A device that can eliminate the need for such larger motors and gearboxes is desirable. U.S. Pat. No. 9,995,506, which is incorporated herein by reference, describes a system for solar tracking for solar array systems.

SUMMARY

One object of the present invention is to provide a damping apparatus comprising a spring, wherein contamination of the spring by debris and other external elements is minimized. Another object of the present invention is to provide a solar tracking system that does not require a large motor or gearbox to compensate for the moment that is induced when a solar panel is rotated off horizontal. These and other objects of the invention can be achieved in one or more embodiments of the invention disclosed herein.

One embodiment of the invention comprises a self-centering damping apparatus.

Another embodiment of the invention comprises a method of solar tracking a solar array using a self-centering damping apparatus.

Another embodiment of the invention comprises a solar tracking system comprising a self-centering damping apparatus.

Another embodiment of the invention comprises a lawn mower comprising a self-centering damping apparatus.

Another embodiment of the invention comprises a damping apparatus comprising a housing defining an interior, the housing having an interior surface and an exterior surface, and a first end and a second end opposite the first end. A rod can be partially positioned within the interior of the housing, and the housing has an opening at the first end for receiving the rod therethrough. The rod moveable between an extended position and a compressed position. A mechanical spring can be operatively connected to the rod and contained within the interior of the housing. The mechanical spring applies force to an outer surface of the rod and the interior surface of the housing.

According to an embodiment of the invention, the mechanical spring is not in direct contact with the rod, and is operatively connected to the rod by at least one retaining member that is attached to the rod and the spring.

According to another embodiment of the invention, the mechanical spring contacts the inner surface of the housing.

According to an embodiment of the invention, the housing is substantially cylindrical, the opening in the first end of the housing is substantially circular, the rod is substantially cylindrical, and the mechanical spring is substantially cylindrical. The mechanical spring has a diameter greater than the opening in the first end of the housing, whereby the spring cannot exit the housing.

According to an embodiment of the invention, the rod has first and second opposed ends. The first end of the rod resides exterior to the housing and the second end of the rod is within the interior of the housing. A clevis or connection head can be attached at the first end of the rod.

According to an embodiment of the invention, the rod has first and second opposed ends. The first end of the rod resides exterior to the housing and the second end of the rod is within the interior of the housing. A piston head can be positioned at the second end of the rod.

According to an embodiment of the invention, the mechanical spring biases the rod to a centered position when the rod is moved to the extension position and biases the rod to a centered position when the rod is moved to the compression position, whereby the dampening apparatus is self-centering.

According to an embodiment of the invention, the mechanical spring is pre-compressed and preloaded.

According to an embodiment of the invention, a groove is formed in the housing, and the groove frictionally engages the retaining member, whereby the spring cannot move beyond the groove.

Another embodiment of the invention comprises a damping apparatus comprising a housing defining an interior, the housing having an interior surface and an exterior surface, and a first end and a second end opposite the first end. A rod can be partially positioned within the interior of the housing and connected to the housing. The housing has an opening at the first end for receiving the rod therethrough. The rod and the housing are moveable between an extended position and a compressed position. A tube assembly contains the rod and the housing. A spring assembly is operatively connected to the exterior surface of the housing, wherein the spring assembly applies force to the exterior surface of the housing.

According to an embodiment of the invention, the spring assembly comprises at least one pre-compressed and pre-loaded mechanical spring.

According to an embodiment of the invention, the at least one mechanical spring biases the housing and the rod to a centered position when the rod is moved to the extension position and biases the rod to a centered position when the rod is moved to the compression position, whereby the dampening apparatus is self-centering.

According another embodiment of the invention, the spring assembly includes first and second retaining members positioned on the housing on opposite sides of the at least one mechanical spring, and first and second sleeve members positioned on the housing on opposite sides of the mechanical spring. The mechanical spring can be attached to the first and second sleeve members, and the tube assembly can comprise a first tube and a second tube. The first tube can be telescopically positioned within an interior of the second tube and adapted for sliding movement therein. The mechanical spring can be completely contained within the first tube.

According to an embodiment of the invention, the first tube defines a first end distal to the second tube and a second end proximal to the second tube. The first tube has a first groove formed therein proximal to the first end for frictionally engaging the first retaining member or the first sleeve member, and the first tube has a second groove formed therein proximal to the second end for frictionally engaging the second retaining member or the second sleeve member, whereby the mechanical spring cannot move beyond the first and second grooves in the first tube member.

Another embodiment of the invention comprises a solar tracking apparatus comprising a solar panel adapted to absorb solar energy for generating electricity or heat, a rotating shaft operatively connected to the solar panel to rotate the solar panel toward a solar energy source, and a self-centering damping apparatus operatively connected to the rotating shaft. The self-centering damping apparatus compensates for torque induced in the rotating shaft when the rotating shaft rotates the solar panel at an angle to horizontal.

BRIEF DESCRIPTION OF THE DRAWINGS

FIG. 7A is a partial enlarged view of the damping apparatus of FIG. 7;

FIG. 7B is another partial enlarged view of the damping apparatus of FIG. 7;

DETAILED DESCRIPTION OF PREFERRED EMBODIMENTS

Figure 1:
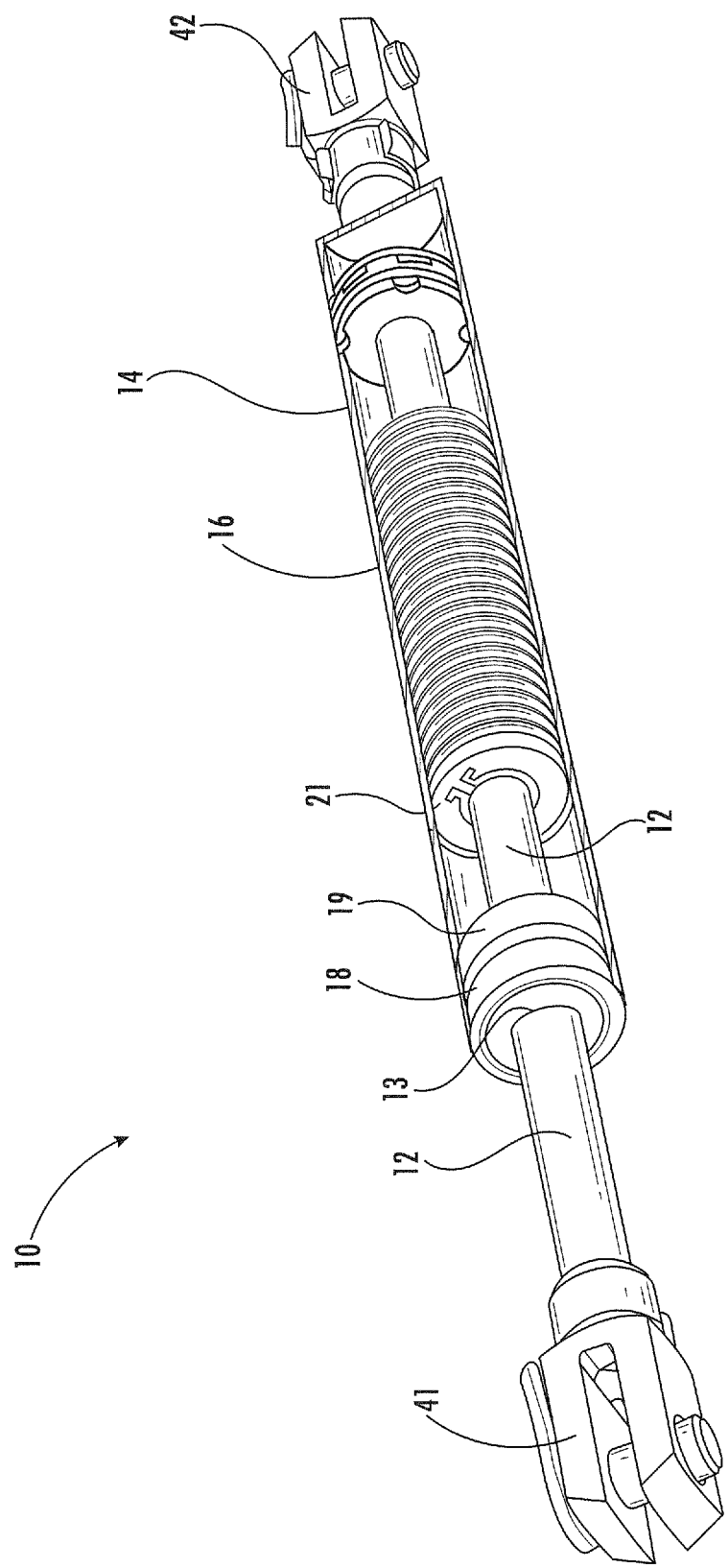
FIG. 1 is a partially cross-sectioned perspective view of a damping apparatus according to an embodiment of the invention.

A damping apparatus according to a preferred embodiment of the invention is illustrated in FIGS. 1-6 and shown generally at reference numeral 10. The apparatus 10 comprises a piston rod 12 positioned within a hollow, cylindrical housing 14. A circular opening 13 is formed at one end of the housing 14 to allow for sliding movement of the piston rod 12 therethrough, as shown in FIGS. 1-4.

Figure 2:
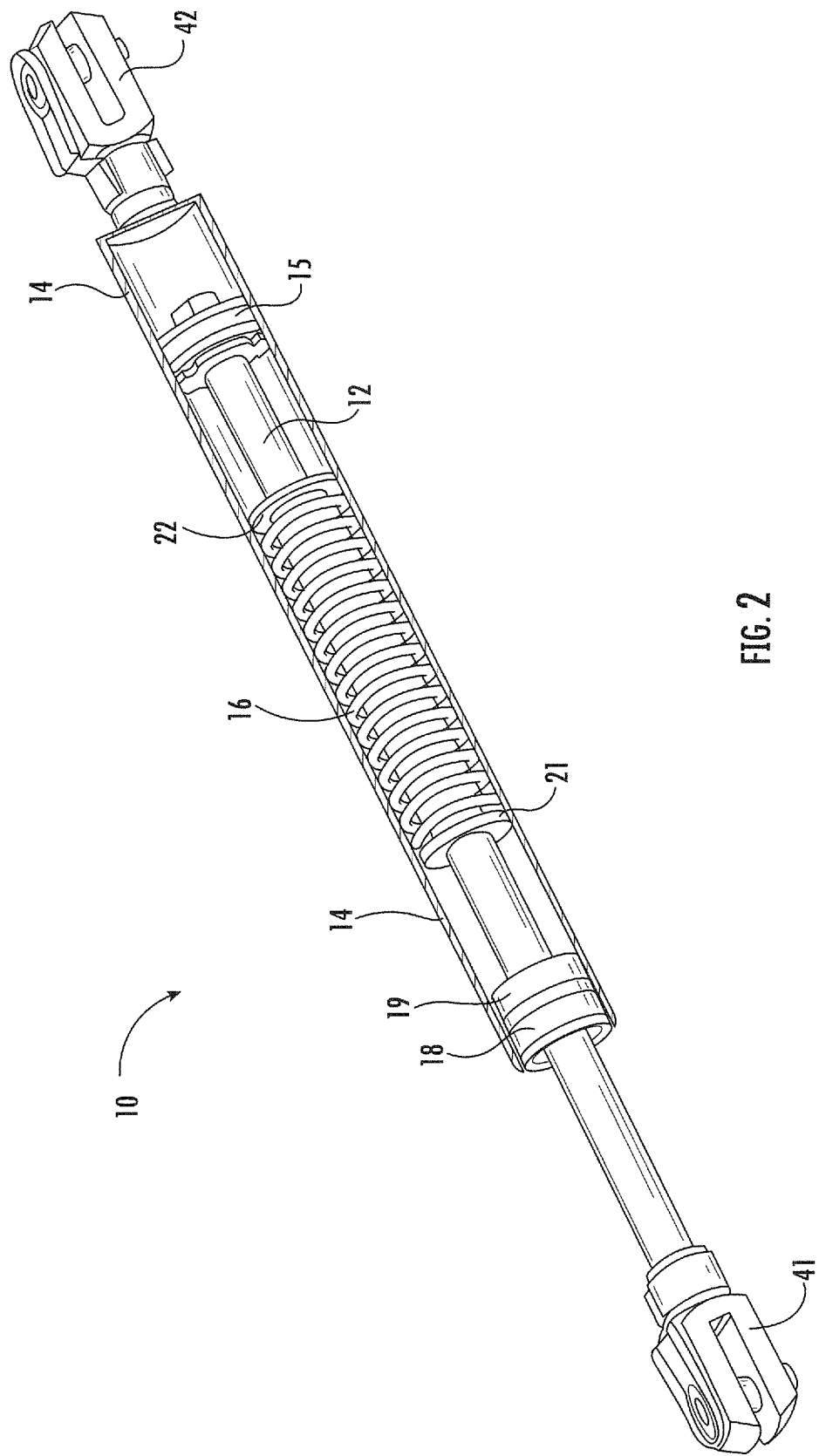
FIG. 2 is another partially cross-sectioned perspective view of the damping apparatus of FIG. 1.

A pre-compressed and preloaded mechanical spring 16 is operatively connected to the inner surface of the housing 14 and the outer surface of the rod 12. The spring 16 can be connected to the rod 12 via fastening members, such as a pair of e-clips 21, 22. As shown in FIGS. 1 and 2, one end of the spring 16 is attached to one e-clip 21, and the opposite end of the spring 16 is attached to the other e-clip 22. A pair of grooves 31, 32 can be formed in the housing 14, and the e-clips 21, 22 can be positioned in the grooves 31, 32, respectively. The spring 16 contacts the inner surface of the housing 14, but does not directly contact the rod 12, thus minimizing wear on the sealing surface of the rod 12.

The spring 16 is completely contained within the housing 14, as shown in FIGS. 1-4. The portion of the piston rod 12 supporting the spring 16 cannot move beyond the housing 14. E-clip 21 has a diameter greater than the opening 13 in the housing 14. The opening 13 is shaped and sized to conform to the diameter of the piston rod 12, such that there is no exposure of the spring 16 to debris and other contaminating elements external to the housing 14.

Figure 3:
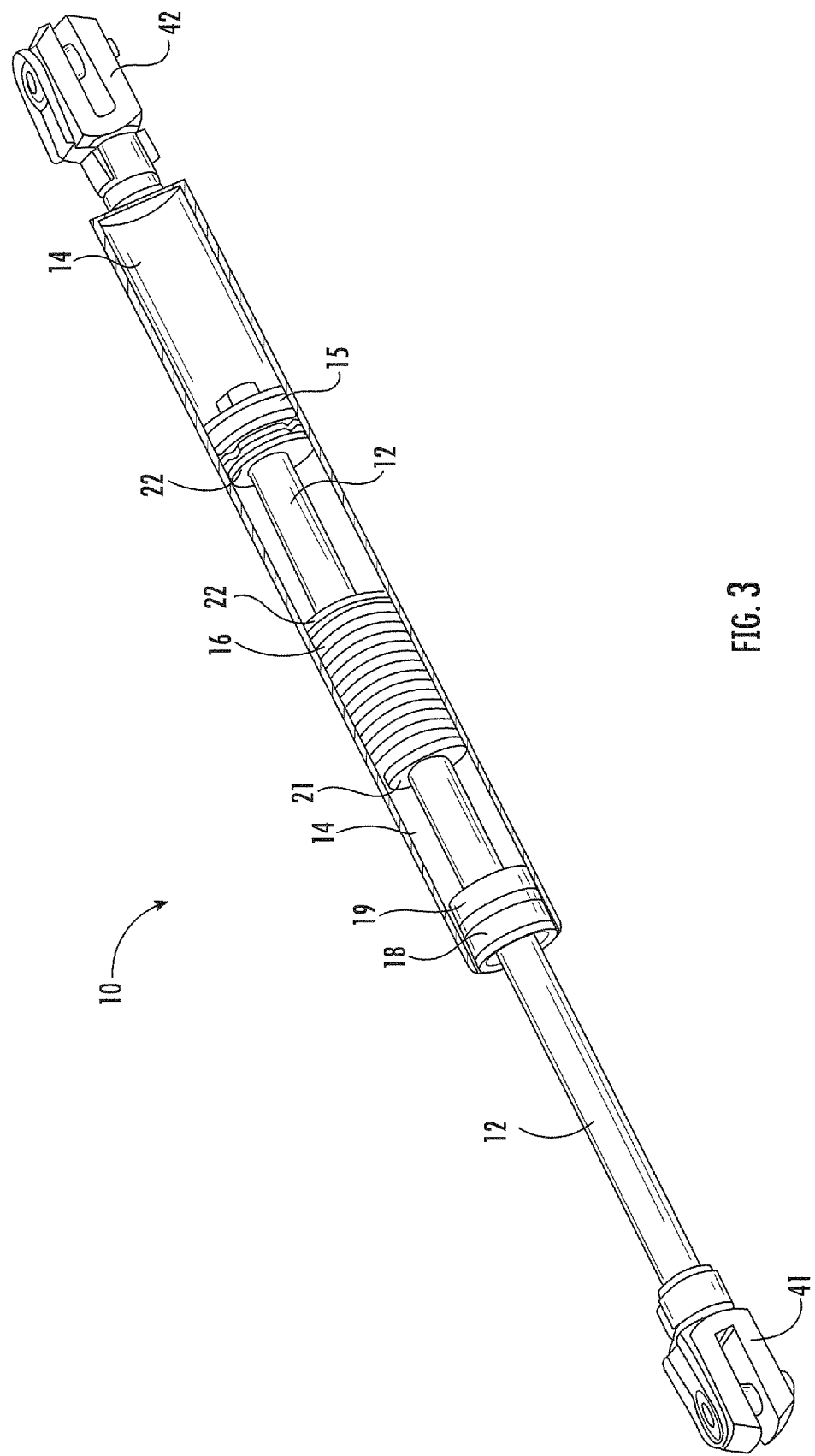
FIG. 3 is another partially cross-sectioned perspective view of the damping apparatus of FIG. 1.
Figure 4:
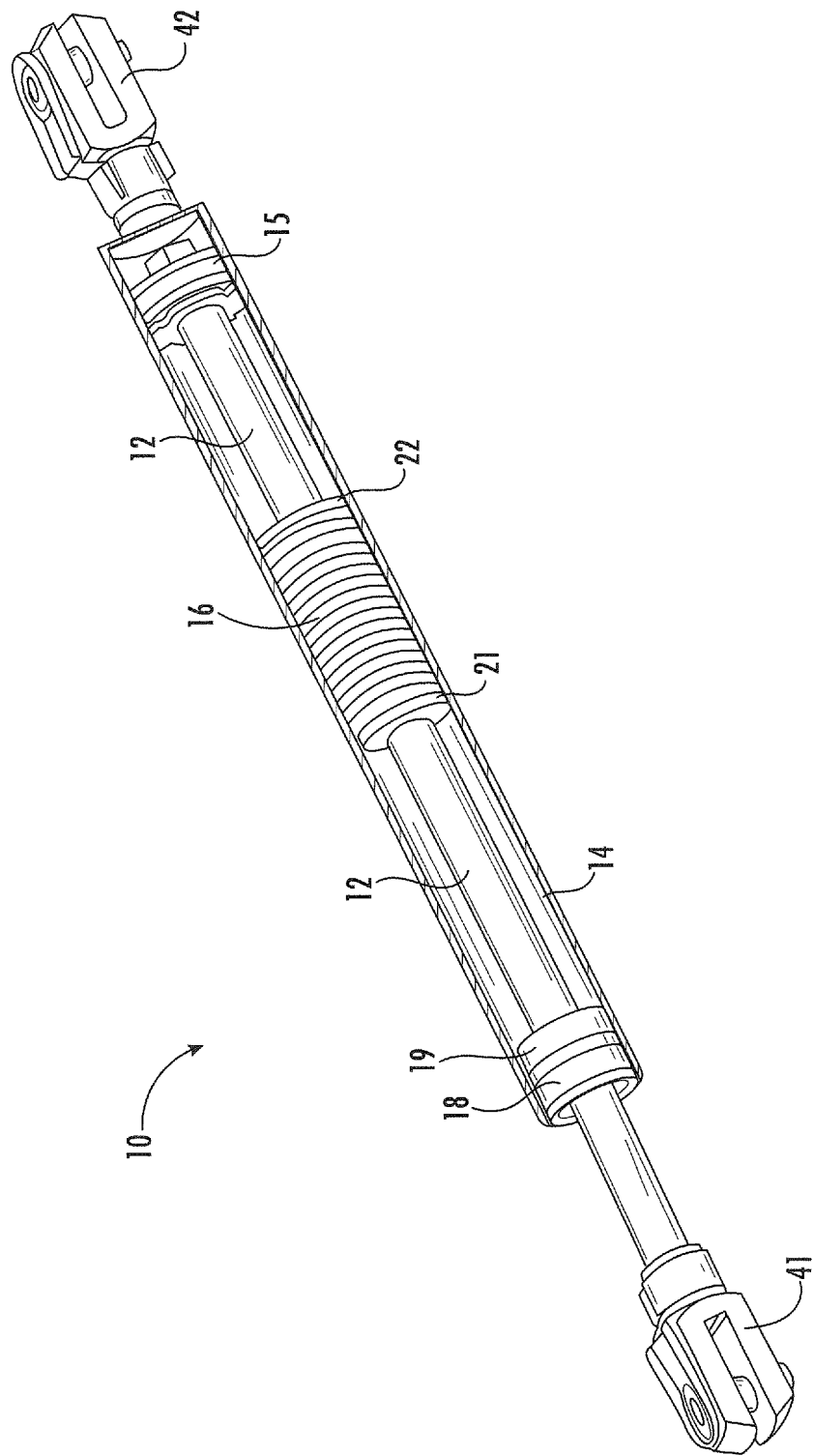
FIG. 4 is another partially cross-sectioned perspective view of the damping apparatus of FIG. 1.
Figure 5:
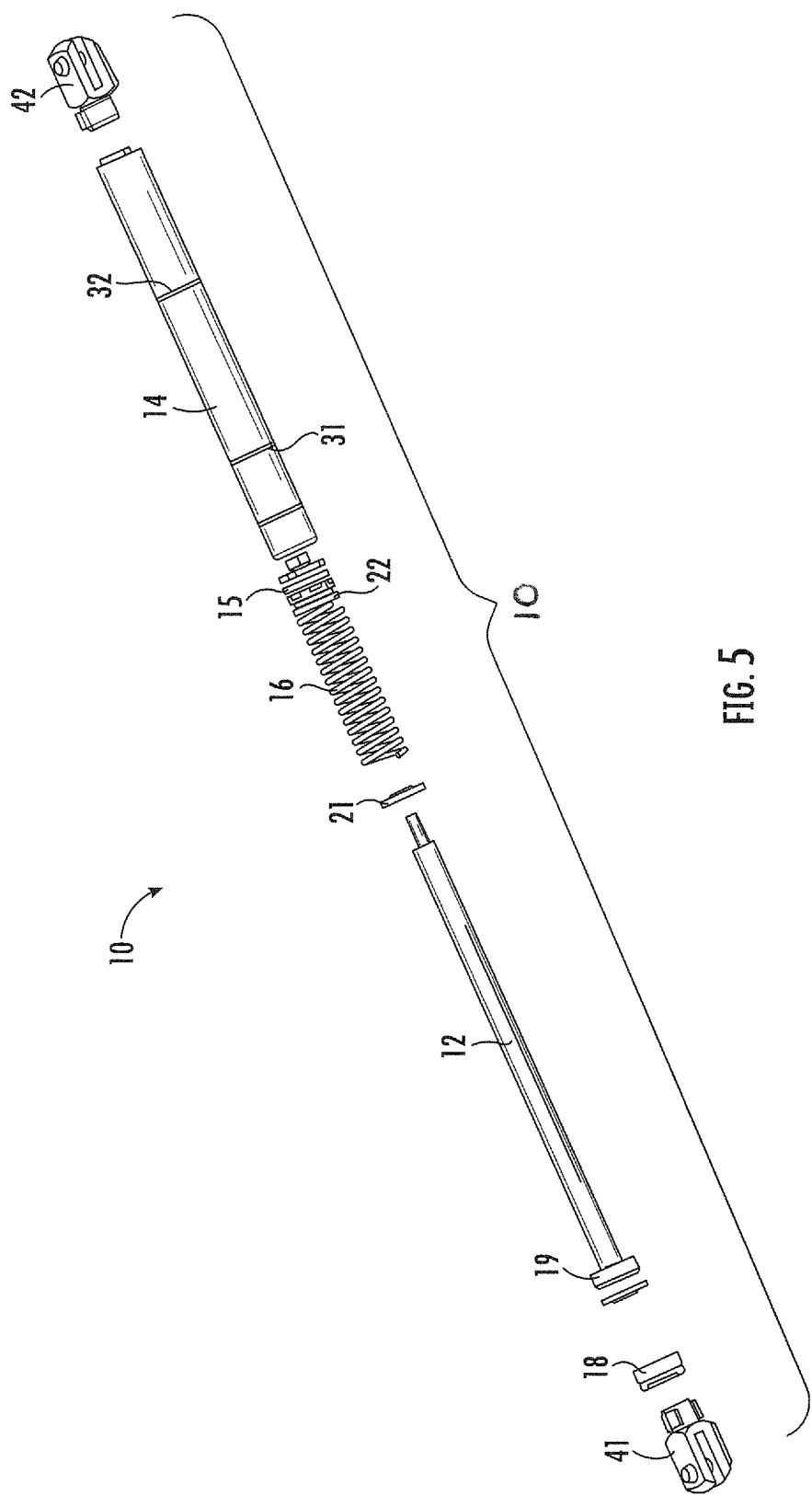
FIG. 5 is an exploded perspective view of the damping apparatus of FIG. 1.

The housing 14 can include a cylindrical sealing member 18 positioned at an end of the housing 14 and defining the opening 13 through which the piston rod 12 is positioned through, as shown in FIGS. 2-4. The sealing member 18 provides a tight seal to prevent debris from entering into the housing 14.

A bump stop 19 can be positioned next to the sealing member 18, as shown in FIGS. 1-4. The bump stop 19 can be a disc made of a resilient material. The sealing member 18 and the bump stop 19 each have a central opening through which the piston rod 12 can be positioned therethrough. The bump stop 19 absorbs impact from the e-clip 21 when the piston rod 12 is fully extended, thereby protecting the sealing member 18. A piston head 15 is positioned on an end of the piston rod 12 that is contained within the housing 14 and distal to the housing opening 13, as shown in FIGS. 1-4.

A fastener such as a clevis 41 can be attached to the opposite end of the piston rod 12 proximate to the housing opening 13, as shown in FIGS. 1-4. A second clevis 42 can be attached at the end of the housing 14 that is distal to the first clevis 41, as shown in FIGS. 2-4.

The force of the spring 16 is applied to the outer diameter of the rod 12 and the inner diameter of the housing 14. The force is applied throughout the complete stroke of the piston rod 12, not just at the end of travel, allowing the spring 16 to be pre-compressed. With the spring 16 pre-compressed, the apparatus 10 can be assembled in a conventional manner.

The spring 16 applies force to the piston rod 12 during both compression and extension strokes. If the piston rod 12 is pulled outward in an extension stroke, as shown in FIG. 3, the force of the spring 16 biases the piston rod 12 back in a compression motion to a centered position, shown in FIG. 2. Conversely, if the piston rod 12 is pushed inward in a compression stroke, shown in FIG. 4, the spring 16 biases the rod 12 back in an extension motion to the centered position. As such, the damping apparatus 10 is self-centering.

Alternatively, one of the connections between the spring 16 and the inner diameter of the housing 14 can be omitted, such that the force of the spring is unidirectional in either the extending or compressing direction. In one alternative embodiment, e-clip 21 can be omitted from the apparatus 10, and the spring 16 is connected to the housing 14 by only e-clip 22. In another alternative embodiment, e-clip 22 can be omitted, and the spring 16 is connected to the housing 14 by only e-clip 21.

A preferred embodiment of the invention comprises a method of using the damping apparatus 10, wherein the damping apparatus can be used in a zero-turn riding lawn mower to provide self-centering damping force on the steering assembly of the mower. In another method of use according to another embodiment of the invention, the damping apparatus 10 can be used to provide damping of a solar (photovoltaic) panel array.

The spring 16 is completely contained within the housing 14, thereby protecting the spring 16 from debris and contamination from other elements external to the housing 14. As such, debris affecting output forces is minimized.

The spring 16 remains inside the housing 14 at all times. A lubricant such as oil can be provided within the housing 14. The oil lubricates the spring 16, thereby reducing frictional forces of the damping apparatus 10.

The damper apparatus 10 can be made from any suitable materials, such as metal, plastic, ceramic and composite materials. The damping apparatus 10 can be made using any suitable technique, including but not limited to, machining. Exemplary methods for making a damper apparatus are described in U.S. Pat. No. 7,631,922, which is incorporated herein by reference.

An embodiment of the invention comprises a lawn mower comprising the damper apparatus 10. The damper apparatus 10 provides self-centering damping force on the steering of the mower. The lawn mower can be a zero-turn riding lawn mower having a pair of steering levers, and a damper apparatus 10 can be operatively connected to each of the steering levers. Each damper apparatus 10 can be attached to each steering lever of the mower via either the first clevis 41 or second clevis 42.

Figure 7:
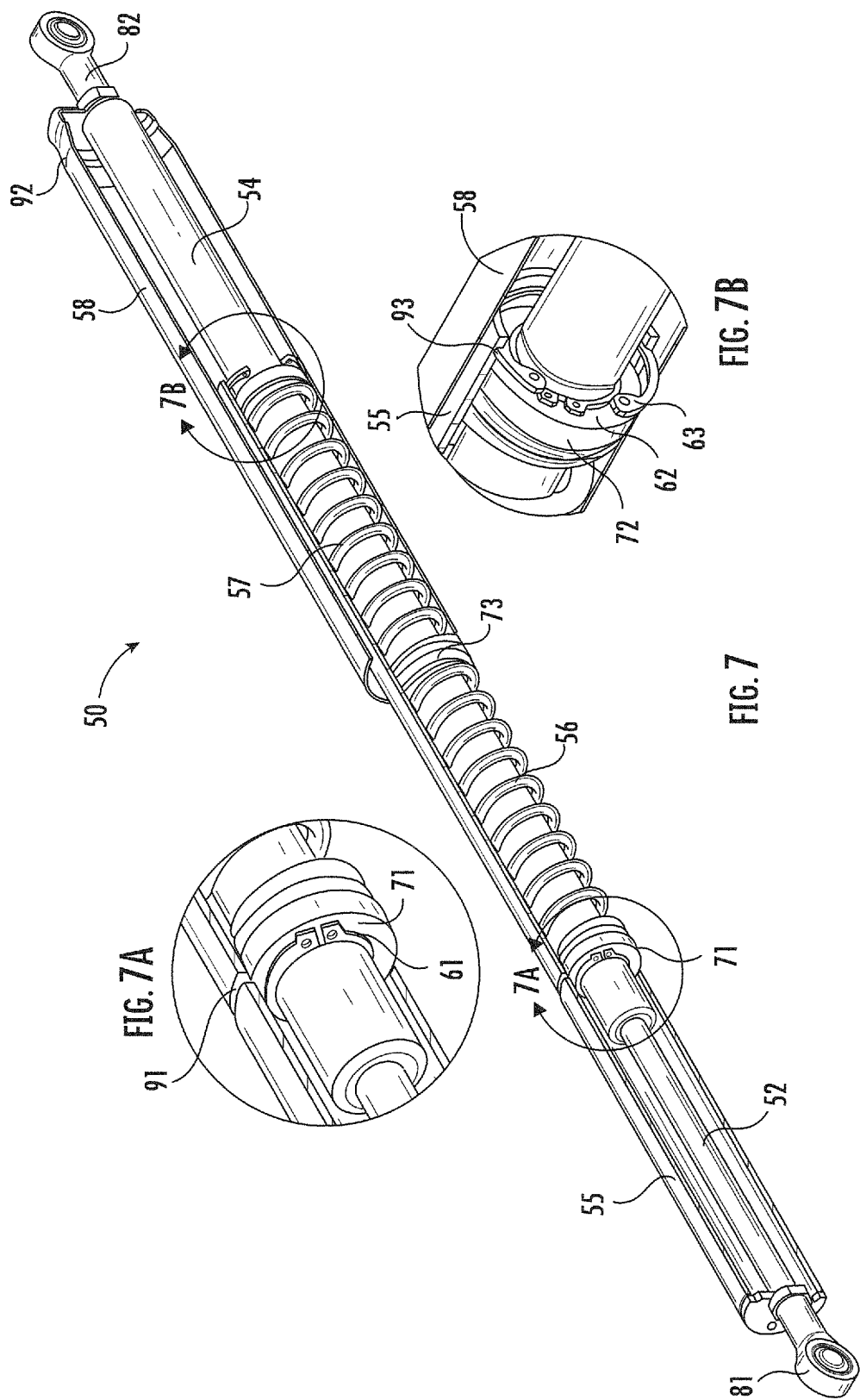
FIG. 7 is a partially cross-sectioned perspective view of a damping apparatus according to another embodiment of the invention.
Figure 8:
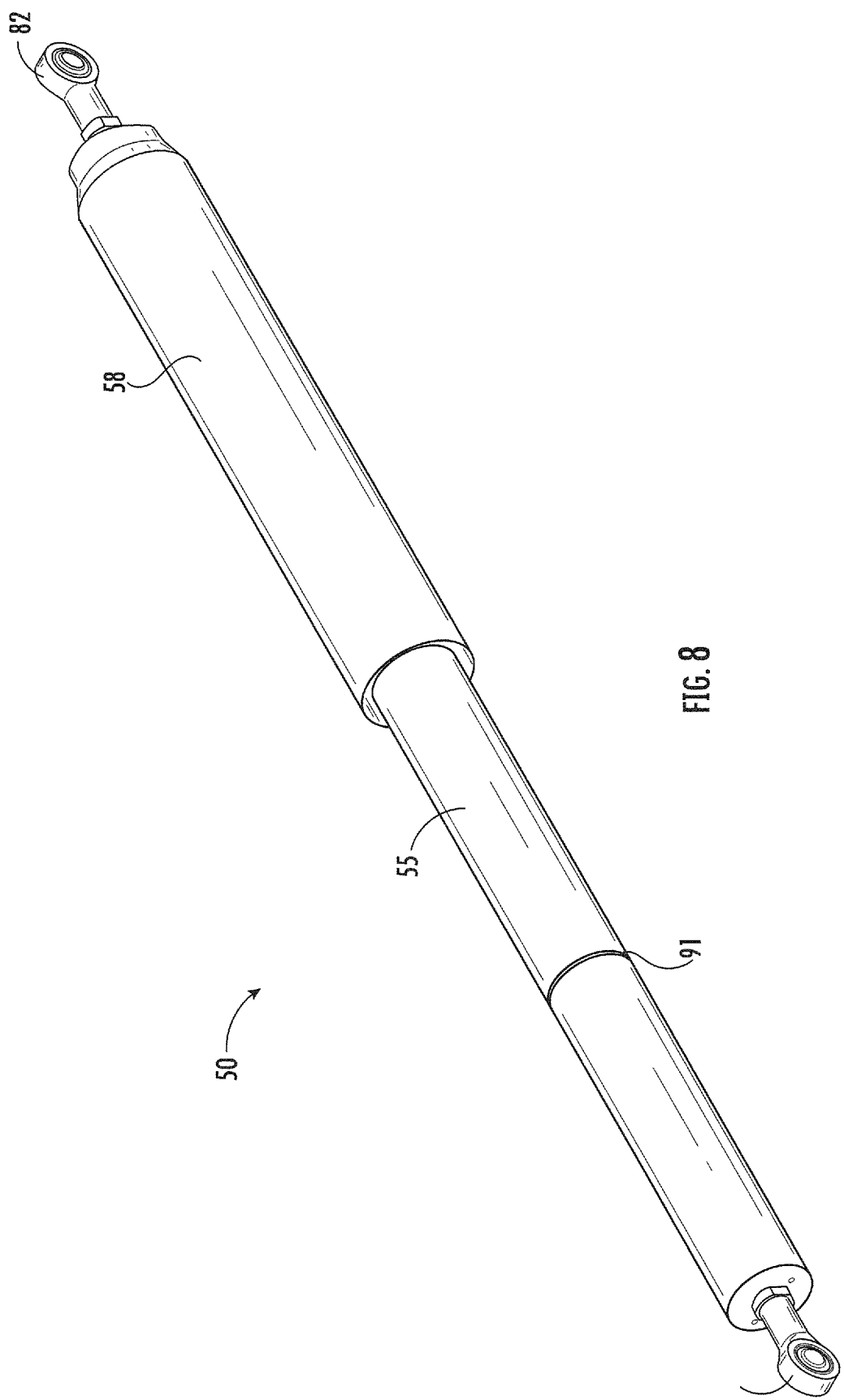
FIG. 8 is another perspective view of the damping apparatus of FIG. 7.

A self-centering damping apparatus according to another embodiment of the invention is illustrated in FIGS. 7-11, and shown generally at reference numeral 50. The apparatus 50 comprises a piston rod 52 positioned within a hollow, cylindrical damper housing 54. A circular opening 53 is formed at one end of the housing 54 to allow for the piston rod 52 to be inserted therethrough, as shown in FIGS. 7 and 7A.

A spring assembly is operatively connected to the housing 54. The spring assembly can comprise a pair of pre-compressed and preloaded mechanical springs 56, 57 can be operatively connected to the outer surface of the housing 54. Alternatively, the apparatus 50 can include only one spring or more than two springs. The springs 56, 57 can be connected to the outer surface of the damper housing 54 by outwardly extending retaining members 61, 62, and sleeve members 71, 72, 73 positioned on the housing 54, as shown in FIGS. 7, 7A and 7B. The retaining members 61, 62 can be external retainer rings, e-clips or other like retaining members 61, 62. The outwardly extending sleeve members 71, 72, 73 can be washers, bushings, sleeve bearings or other like fixed sleeve members 71, 72, 73.

Figure 9:
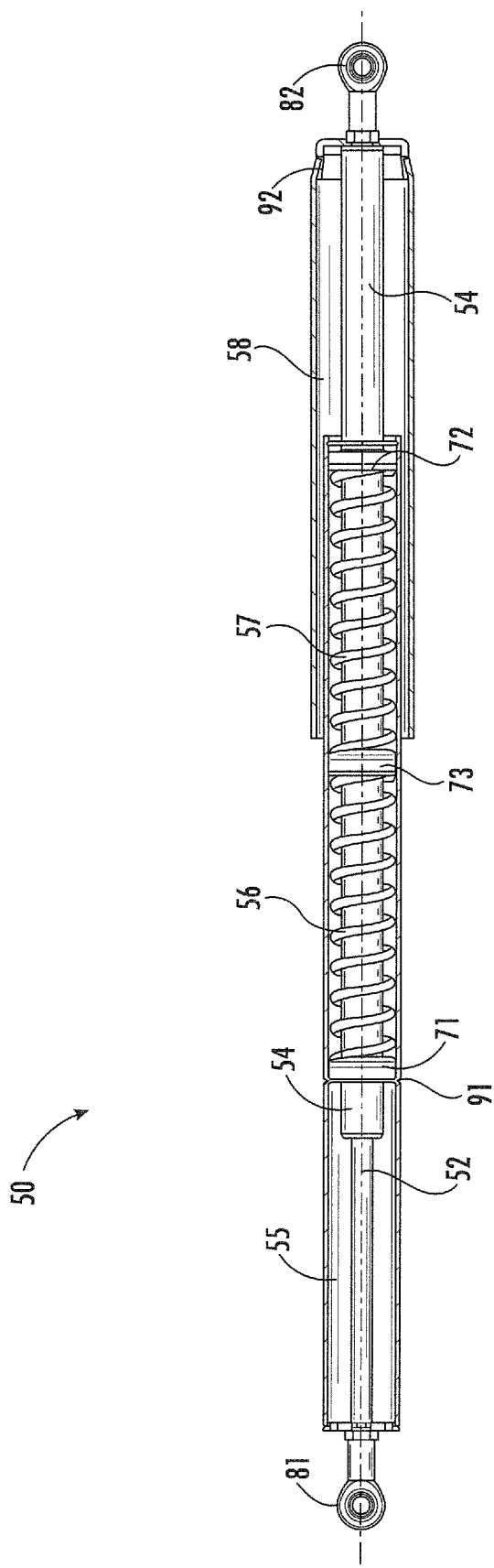
FIG. 9 is a partially cross-sectioned view of the damping apparatus of FIG. 7.

The springs 56, 57 are completely contained within a hollow, cylindrical tube 55. The tube 55 is preferably made of metal, as shown in FIGS. 7 and 9. At least a portion of the damper housing 54 is contained within the tube 55. The tube 55 can have an opening through which the damper housing 54 is positioned, as shown in FIGS. 7 and 7B. The washer 72 positioned on the housing 54, shown in FIG. 7B, can act as a sealing member preventing debris and other contaminating elements from entering into the tube 55 and damaging the springs 56, 57.

Figure 6:
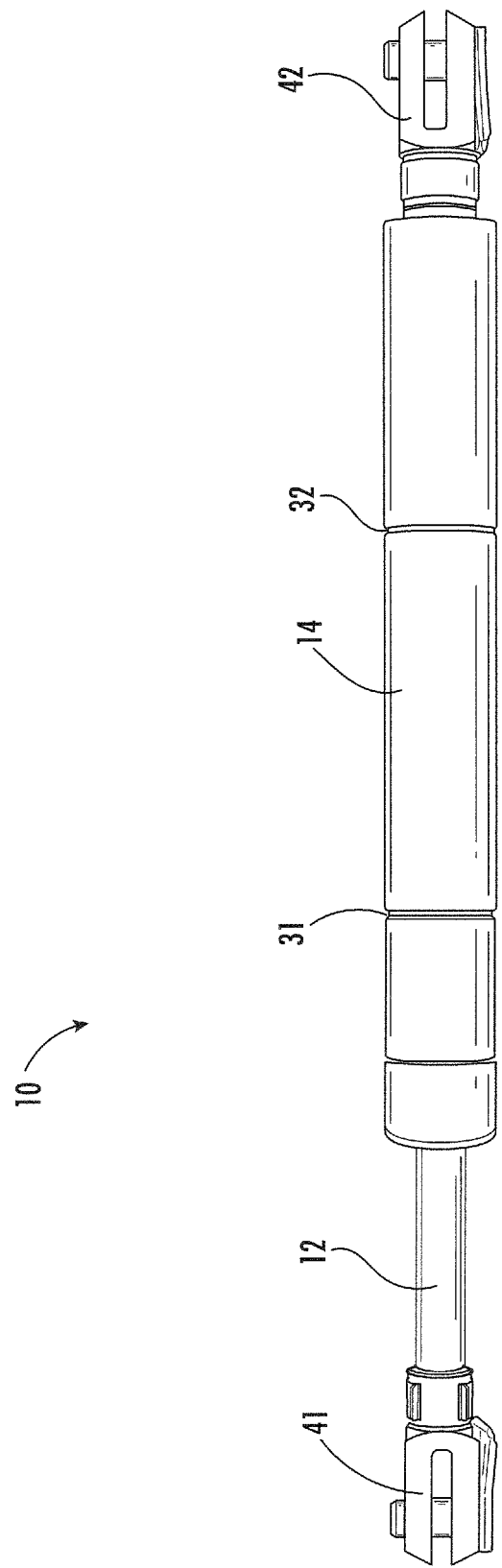
FIG. 6 is a another perspective view of the damping apparatus of FIG. 1.

A cover 58 can be positioned over a portion of the exterior surface of the tube 55, as shown in FIG. 6. The cover 58 is preferably a plastic tube. The tube 55 and the cover tube 58 together completely contain the damper housing 54, as shown in FIGS. 7 and 9. In an alternative embodiment, the damping apparatus 50 does not include the cover 58, and the housing 54 and piston rod 52 are completely contained within the tube 55. Fasteners 81, 82, such as connection heads, can be attached at opposite ends of the piston rod 52.

A groove 91 can be formed on the exterior surface of the tube 55, and a groove 93 can be formed in the interior surface of the tube 55, as shown in FIGS. 7, 7A and 7B. The springs 56, 57 are connected to the tube 55 by the internal retainer ring 63 positioned within the groove 93 formed in the interior surface of the tube 55. As such, the spring assembly 56, 57 cannot move beyond the tube 55. Another groove 92 is formed on the external surface of the cover tube 58, as shown in FIG. 7, thereby reducing the inner diameter of the cover tube 58 at that point. When in the centered (neutral) position, shown in FIG. 7, the washer 71 is frictionally engaged by the reduced inner diameter of the damper housing 54 created by the groove 91, as shown in FIG. 7A. The springs 56, 57 can be connected to the inner surface of the tube 55 by the internal retainer ring 63, as shown in FIG. 7B.

Figure 10:
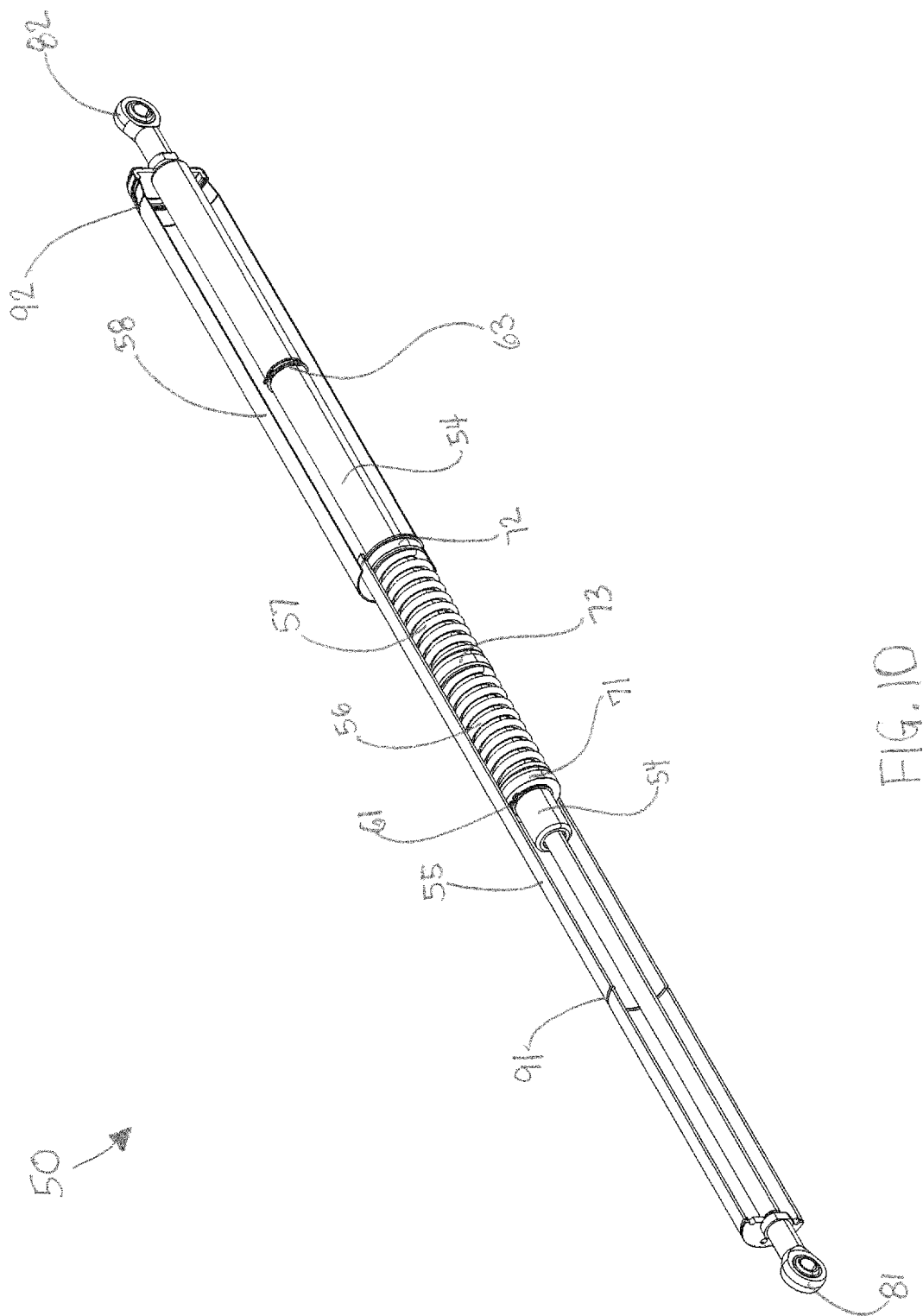
FIG. 10 is a perspective view of the damping apparatus of FIG. 7.
Figure 11:
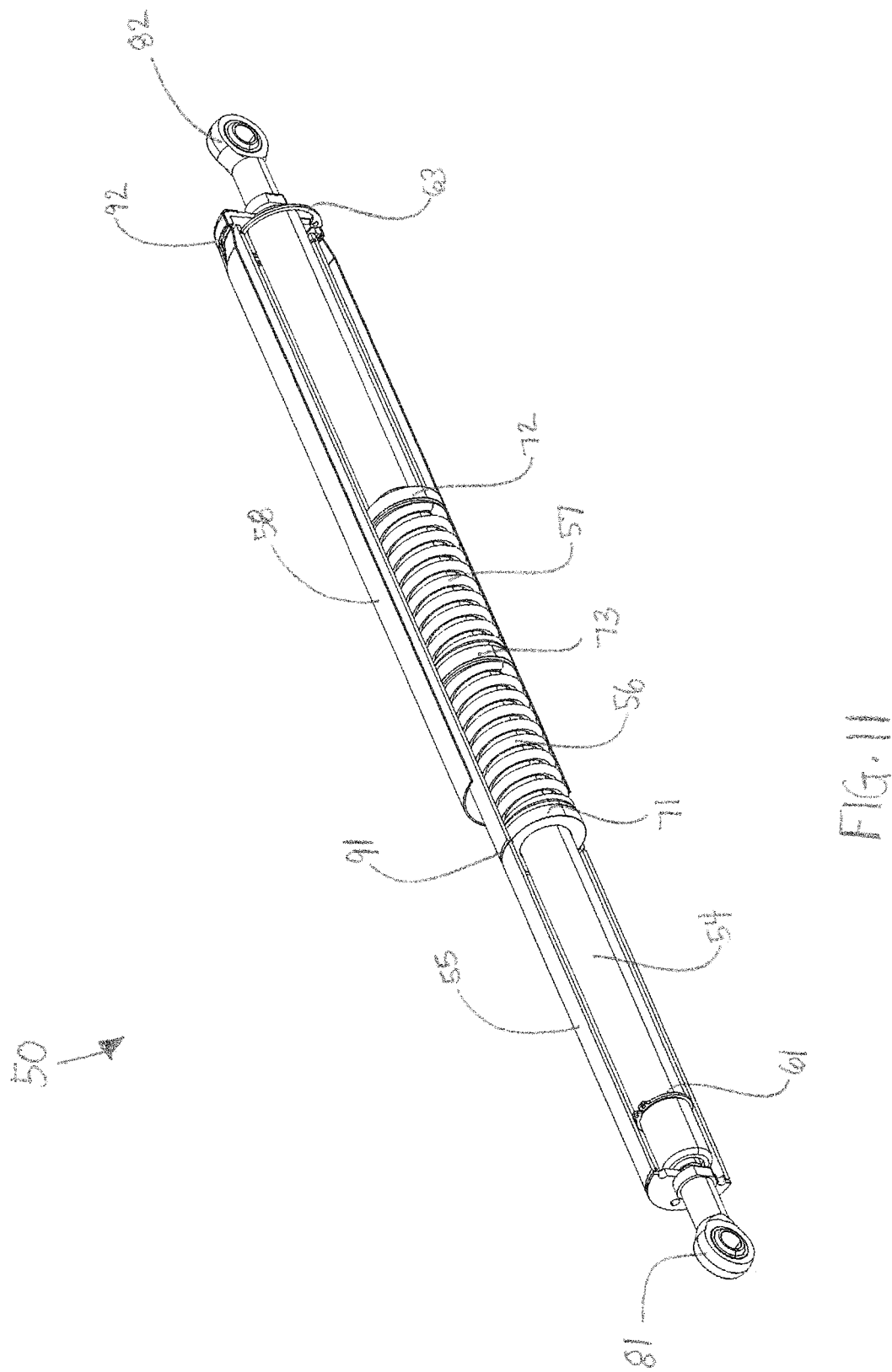
FIG. 11 is another perspective view of the damping apparatus of FIG. 7.

The springs 56, 57 apply force to the damper housing 54 during both extension and compression strokes, shown in FIGS. 10 and 11, respectively. When the rod 52 is pulled outward in an extension stroke, shown in FIG. 10, the force of the springs 56, 57 biases the rod 52 back in a compression motion to a centered position, shown in FIG. 7. When the rod 52 is pushed inward in a compression stroke, shown in FIG. 11, the springs 56, 57 bias the rod 52 back in an extension motion to the centered position, shown in FIG. 7. As such, the damping apparatus 50 is self-centering. During the compression stroke, shown in FIG. 11, the external retaining ring 63 is frictionally engaged by the reduced inner diameter of the cover tube 58 created by the groove 92.

The damper apparatus 50 can be made from any suitable materials, such as metal, plastic, ceramic and composite materials. The damping apparatus 50 can be made using any suitable technique, including but not limited to, machining. Exemplary methods for making a damper apparatus are described in U.S. Pat. No. 7,631,922, which is incorporated herein by reference.

According to an embodiment of the invention, the damping apparatus 50 can be used with a solar array. U.S. Patent Application Publication No. 2019/0072150 describes systems and methods for damping photovoltaic panel arrays, and is incorporated herein by reference.

Figure 12:
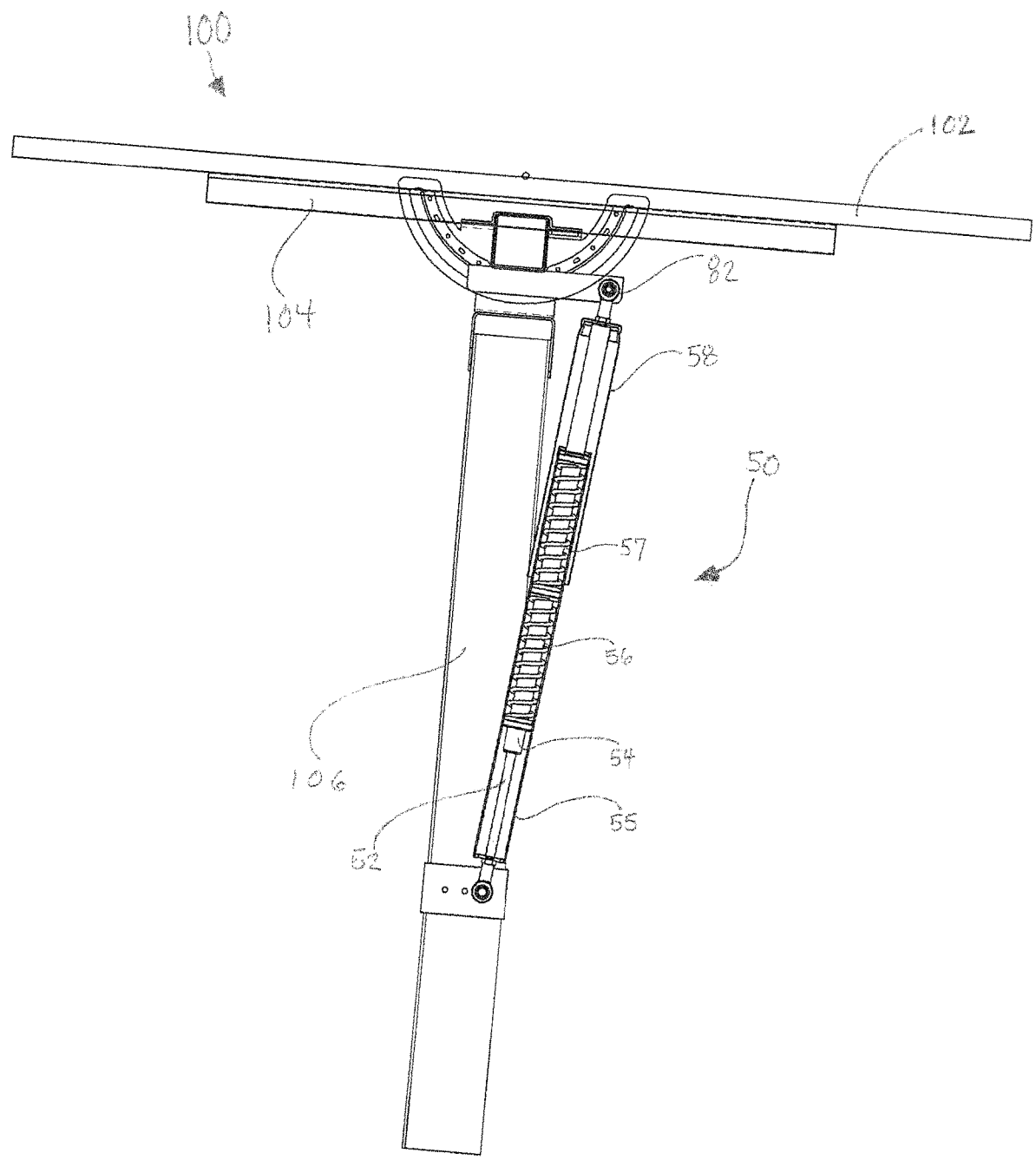
FIG. 12 is a front elevation view of a solar tracking apparatus according to an embodiment of the invention.
Figure 13:
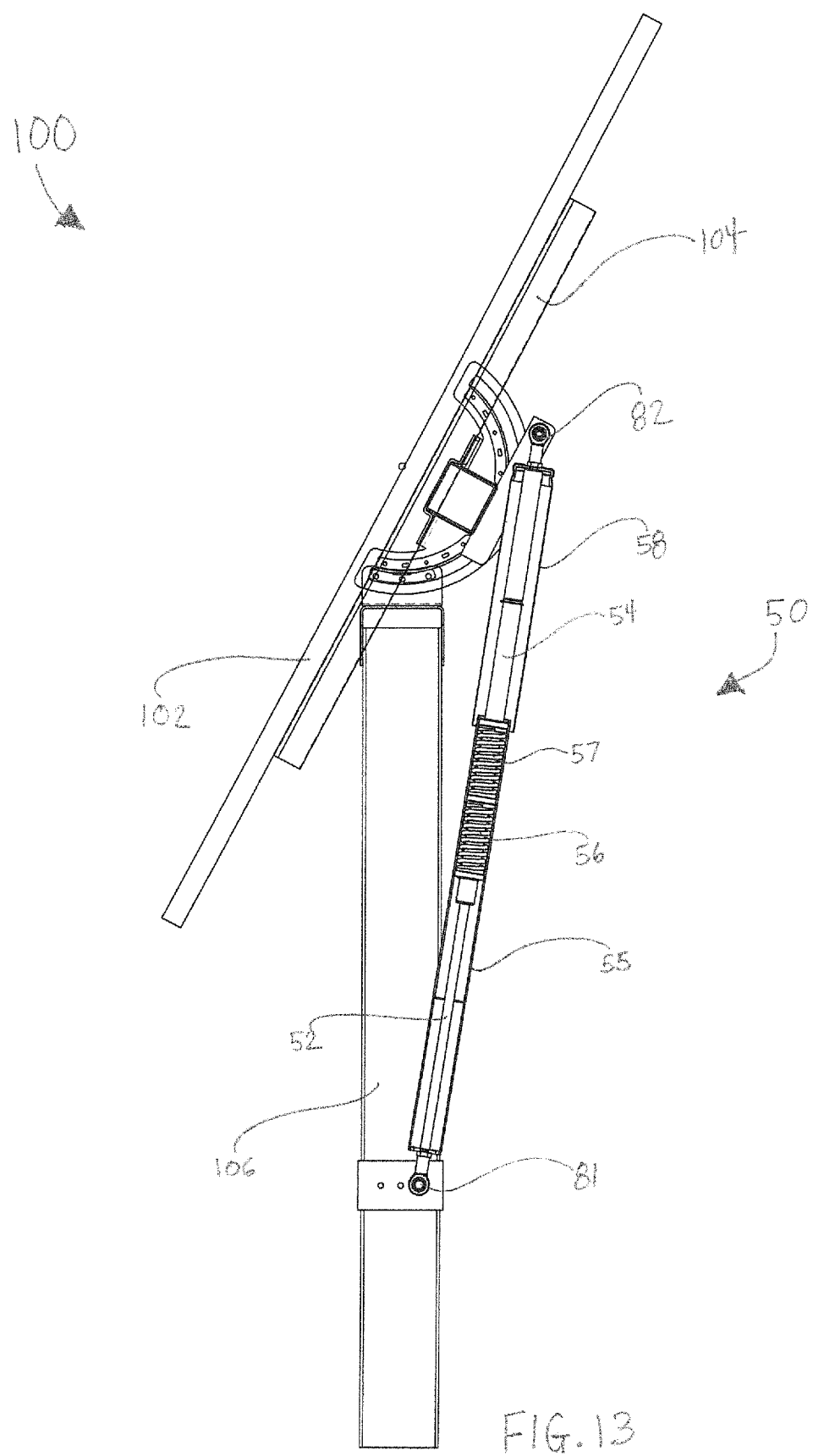
FIG. 13 is another front elevation view of the solar tracking apparatus of FIG. 12.
Figure 14:
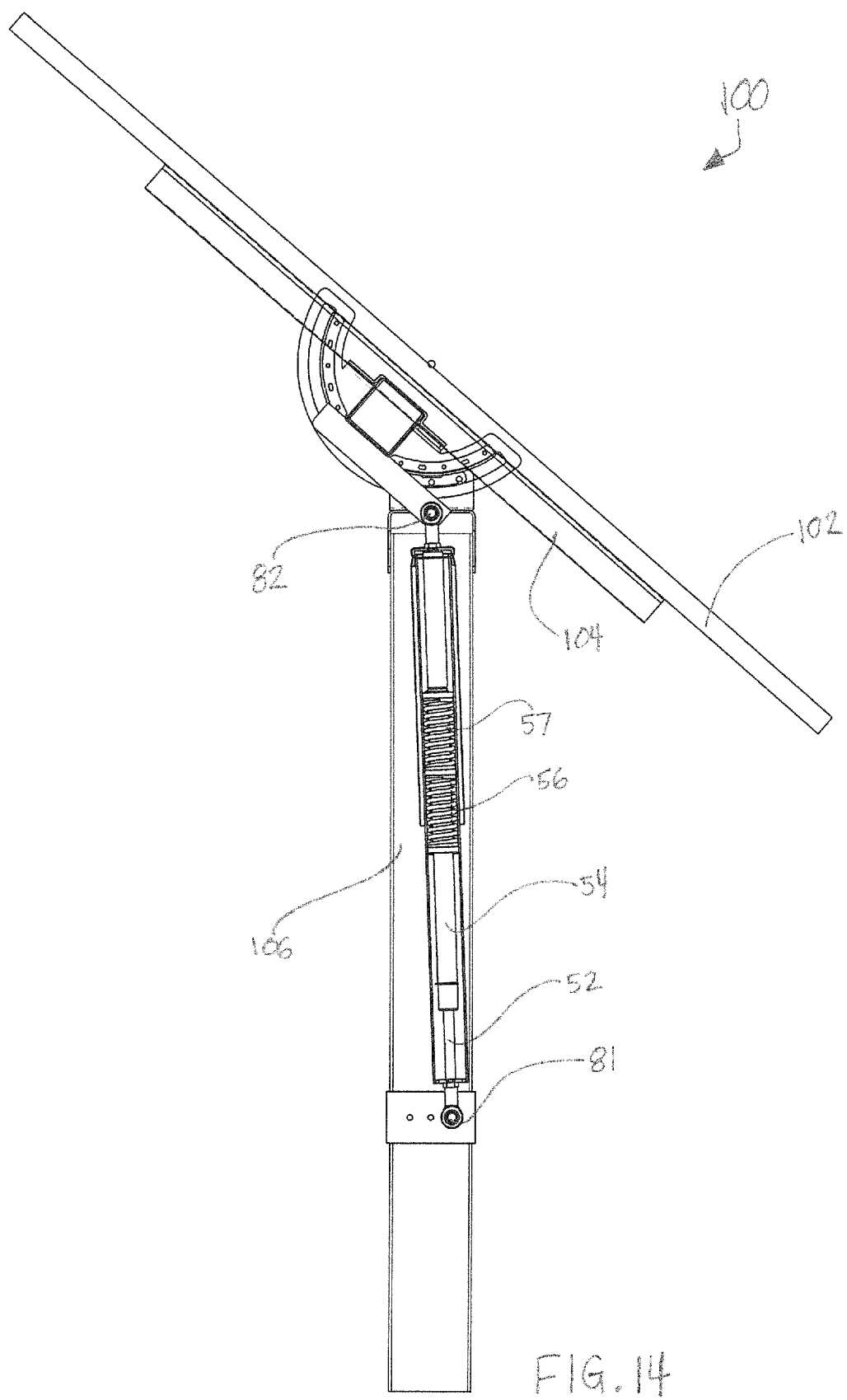
FIG. 14 is another front elevation view of the solar tracking apparatus of FIG. 12.

An embodiment of the invention comprises a solar tracking apparatus 100 comprising the damping apparatus 50, as shown in FIGS. 12-14. The solar tracking apparatus 100 comprises a solar panel 102. The solar tracking apparatus 100 is adapted to rotate the solar panel 102 to orient the panel toward the sun, thereby maximizing energy collection. As shown in FIGS. 12-14, the solar panel 102 can be mounted to a rotatable shaft 104 that is supported on a column 106 and retained by a bearing. The shaft 104 rotates about its center. The solar panel 102 can be rotated about ±60 degrees from horizontal to follow the sun, as shown in FIGS. 12-14. The weight of the solar panel 102 is centered when the panel 102 is horizontal, but when rotated off horizontal a moment is induced into the shaft 104. The mechanical spring force of the damping apparatus 50 compensates for this torque.

The damping apparatus 50 can be connected to the rotating shaft 104, such that movement of the shaft 104 induces movement of the damping apparatus 50. As shown in FIGS. 12-14, the damping apparatus 50 can be connected to the solar panel 102 via the connection heads 81, 82. When the panel 102 is in the horizontal position, shown in FIG. 12, the damping apparatus 50 is in its free length neutral position. When the solar panel 102 rotates at angle from horizontal, as shown in FIG. 13, the damping apparatus 50 moves to the extended position. When the solar panel is rotated in an opposite direction at an angle from horizontal, as shown in FIG. 14, the damping apparatus 50 moves to the compressed position. The spring assembly 56, 57 of the damping apparatus 50 can be sized to match the torque requirement of the shaft 104, effectively neutralizing the torque due to the offset weight of the solar panels 102. As such, the solar tracking apparatus 100 does not require the large motors and gearboxes typically used by existing solar tracking systems to compensate for the applied moment induced by solar panel rotation.

A damping apparatus and method of using same are described above. Various changes can be made to the invention without departing from its scope. The above description of various embodiments of the invention are provided for the purpose of illustration only and not limitation—the invention being defined by the claims and equivalents thereof.

What is claimed is:

1. A damping apparatus comprising:
   (a) a housing defining an interior, the housing having an interior surface and an exterior surface, and a first end and a second end opposite the first end;
   (b) a rod partially positioned within the interior of the housing, the housing having an opening at the first end for receiving the rod therethrough, the rod moveable between an extended position and a compressed position; and
   (c) a single mechanical spring operatively connected to the rod and contained within the interior of the housing, wherein the mechanical spring applies force to an outer surface of the rod and the interior surface of the housing, wherein the mechanical spring biases the rod to a centered position when the rod is moved to the extension position and biases the rod to a centered position when the rod is moved to the compression position, whereby the dampening apparatus is self-centering.

2. The damping apparatus according to claim 1, wherein the mechanical spring is not in direct contact with the rod, and is operatively connected to the rod by at least one retaining member that is attached to the rod and the mechanical spring.

3. The damping apparatus according to claim 2, wherein the mechanical spring contacts the inner surface of the housing.

4. The damping apparatus according to claim 2, wherein the housing is substantially cylindrical, the opening in the first end of the housing is substantially circular, the rod is substantially cylindrical, and the mechanical spring is substantially cylindrical, and further wherein the mechanical spring has a diameter greater than the opening in the first end of the housing, whereby the spring cannot exit the housing.

5. The damping apparatus according to claim 2, wherein the rod has first and second opposed ends, the first end of the rod residing exterior to the housing and the second end of the rod residing within the interior of the housing, and further comprising a clevis or connection head attached at the first end of the rod.

6. The damping apparatus according to claim 2, wherein the rod has first and second opposed ends, the first end of the rod residing exterior to the housing and the second end of the rod residing within the interior of the housing, and further comprising a piston head positioned proximate the second end of the rod.

7. The damping apparatus according to claim 2, wherein the mechanical spring is pre-compressed and preloaded.

8. The damping apparatus according to claim 2, wherein a groove is formed in the housing, and the groove frictionally engages the retaining member, whereby the spring cannot move beyond the groove.

9. A damping apparatus comprising:
   (a) a housing defining an interior, the housing having an interior surface and an exterior surface, and a first end and a second end opposite the first end;
   (b) a rod partially positioned within the interior of the housing and connected to the housing, the housing having an opening at the first end for receiving the rod therethrough, the rod moveable between an extended position and a compressed position;
   (c) a tube assembly containing the rod and the housing; and
   (d) a spring assembly operatively connected to the exterior surface of the housing, the spring assembly comprising a single mechanical spring, wherein the spring assembly applies force to the exterior surface of the housing, and wherein the mechanical spring biases the rod to a centered position when the rod is moved to the extension position and biases the rod to a centered position when the rod is moved to the compression position, whereby the dampening apparatus is self-centering.

10. The damping apparatus according to claim 9, wherein the mechanical spring is pre-compressed and preloaded.

11. The damping apparatus according to claim 9, wherein the spring assembly further comprises first and second retaining members positioned on the housing on opposite sides of the mechanical spring, and first and second sleeve members positioned on the housing on opposite sides of the mechanical spring, the mechanical spring attached to the first and second sleeve members, and wherein the tube assembly comprises a first tube and a second tube, the first tube telescopically positioned within an interior of the second tube and adapted for sliding movement therein, the first tube containing the mechanical spring therein.

12. The damping apparatus according to claim 9, wherein the first tube defines a first end distal to the second tube and a second end proximal to the second tube, the first tube having a first groove formed therein proximal to the first end for frictionally engaging the first retaining member or the first sleeve member, and the first tube having a second groove formed therein proximal to the second end for frictionally engaging the second retaining member or the second sleeve member, whereby the mechanical spring cannot move beyond the first and second grooves in the first tube member.

\* \* \* \* \*